United States Patent
Daghe

[11] 3,840,255
[45] Oct. 8, 1974

[54] TAPPING OR BRANCH SLEEVE FOR PLASTIC PIPE OR THE LIKE
[75] Inventor: Joseph L. Daghe, Decatur, Ill.
[73] Assignee: Mueller Co., Decatur, Ill.
[22] Filed: Feb. 9, 1973
[21] Appl. No.: 331,098

[52] U.S. Cl.................. 285/45, 285/110, 285/197
[51] Int. Cl............................................. F16l 11/12
[58] Field of Search ........... 285/197, 198, 199, 110, 285/45, 47, 373, 423, 419; 277/207

[56] References Cited
UNITED STATES PATENTS

| | | | |
|---|---|---|---|
| 1,928,316 | 9/1933 | Muto | 285/373 |
| 2,463,235 | 3/1944 | Andrews | 285/373 X |
| 3,527,483 | 9/1970 | Dashner | 285/197 |
| 3,535,136 | 10/1970 | Beene | 285/45 |

FOREIGN PATENTS OR APPLICATIONS

| | | | |
|---|---|---|---|
| 7,002,538 | 8/1970 | Netherlands | 285/197 |
| 1,234,017 | 3/1971 | Great Britain | 285/197 |

Primary Examiner—Dave W. Arola
Attorney, Agent, or Firm—Cushman, Darby & Cushman

[57] ABSTRACT

A sleeve-type fitting adaptable for use as a branch sleeve or a tapping sleeve especially when such fitting is used with plastic pipe such as polyethylene (PE) or polyvinyl chloride (PVC) pipe. The fitting includes a service sleeve member having a through bore and having a saddle at one end through which the through bore extends and opens. The saddle has a curved surface for encompassing a portion of the pipe and it carries a gasket ring of a particular configuration in a recess spaced from the opening of the through bore, the gasket ring providing for variation in pipe dimensions and a seal which supports the service sleeve member off of the pipe surface. Clamping means including a saddle clamp member cooperates with the saddle of the sleeve member to substantially encompass the pipe, the clamping means being provided with a support gasket covering the curved surface of the saddle clamp member and protecting the pipe from damage. The support gasket also protects the threads of the bolts for clamping the lower saddle clamping member to the upper saddle of the service sleeve member.

15 Claims, 8 Drawing Figures

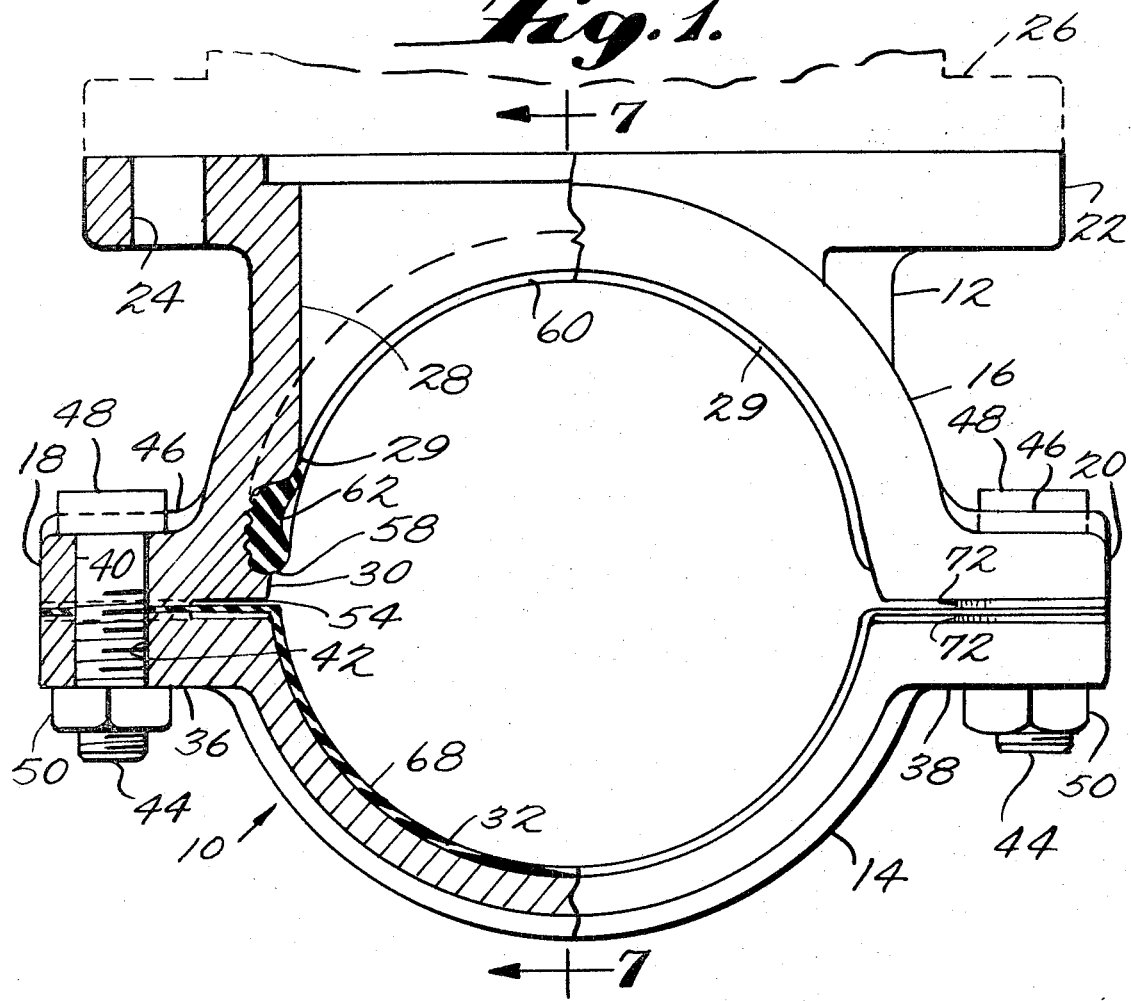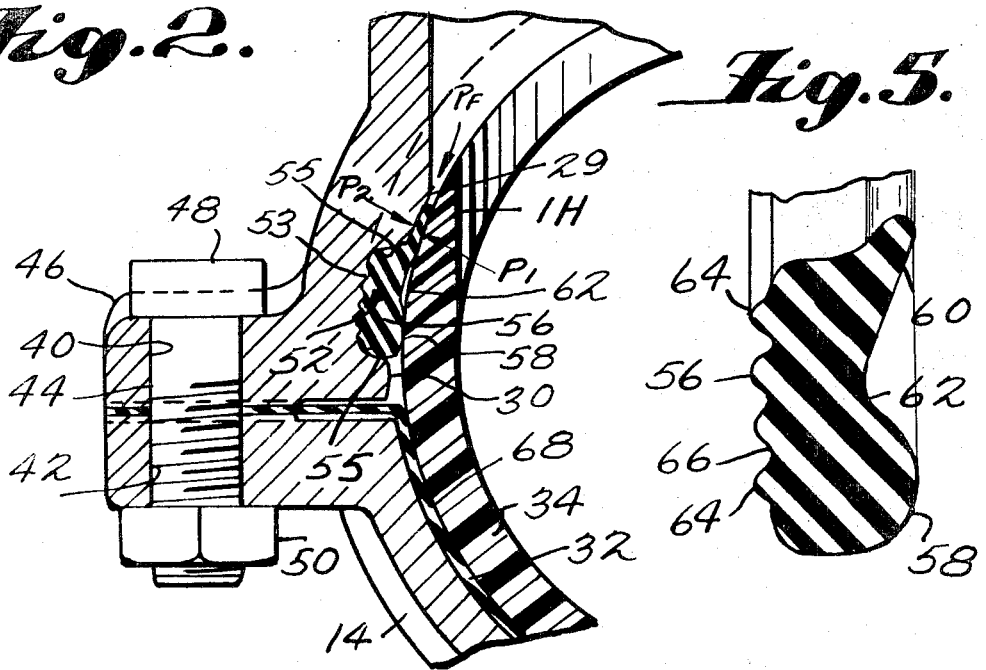

TAPPING OR BRANCH SLEEVE FOR PLASTIC PIPE OR THE LIKE

The present invention relates to a sleeve-like fitting for encompassing a pipe or main to provide means for attaching a branch pipe or service line thereto and/or to provide means for tapping a hole in the pipe or main. While the fitting is preferably used with plastic pipe to obviate the problems encountered with connecting branch lines to such pipe, it may also be used with conventional metal pipe such as cast iron pipe.

BACKGROUND OF THE INVENTION

Sleeve fittings have been utilized for a number of years with pipes such as mains when it is desired to install a branch connection or to tap into the pipe for connecting a future branch pipe. Such sleeve fittings encompass the pipe and were provided with suitable gaskets to seal off a particular surface area of the pipe or around an existing opening through the pipe. When there was no opening in the pipe the fitting was capable of receiving tapping tools and such tapping tools made it possible to tap a hole in the pipe even while the pipe was under fluid pressure and then connect the branch line thereto.

With the advent of the use of plastic pipe such as polyethylene (PE) or polyvinyl chloride (PVC), difficulties were encountered in using the conventional sleeve fittings having an upper sleeve member with a saddle cooperating with a lower saddle clamp member to encompass the pipe. In situations with cast iron pipe and with cast iron parts for the fitting, where the fitting could not be welded to the pipe efforts were made to provide fittings which could be bolted on the pipe and utilize sealing gaskets. However, most of the prior art fittings utilized an O-ring gasket and depended upon the pressure of the part having the O-ring gasket compressing the O-ring gasket tightly against the curved surface of the pipe. This type of prior arrangement could not be used on plastic pipe because the excess loading damaged the pipe. Other arrangements so positioned the gasket so that it was exposed to line pressure, thus they utilized the fluid pressure fluid in the pipe and the branch line to cause the gasket to make a tight seal. The higher the pressure the tighter the seal but oftentimes they leaked at low pressures.

Use of plastic pipes caused problems in that the sleeve-like fitting could not be clamped about the pipe tight enough to make a good seal. If it was clamped tight enough to make a good seal, it often caused the pipe to collapse. Because of this and because the surface of the cast iron fitting was not smooth, the gaskets oftentimes did not provide a full seal.

Additionally, the prior art arrangements permitted the cast iron surface of the saddles to engage the plastic pipe and these rough cast iron surfaces would scratch, cut or abrade the pipe thereby making it more susceptible to pressure failure, especially after the pipe had aged.

The following list of patents represents prior art in this general field.

| | | |
|---|---|---|
| 1,048,364 | Smith | Dec. 24, 1912 |
| 2,146,336 | Frey | Feb. 7, 1939 |
| 2,790,652 | Risley et al. | Apr. 30, 1957 |
| 3,031,200 | Hamer | Apr. 24, 1962 |

-Continued

| | | |
|---|---|---|
| 3,163,432 | De Boer | Dec. 29, 1964 |
| 3,240,227 | Burkholder | Mar. 15, 1966 |
| 3,315,971 | Sakurada | Apr. 25, 1967 |
| 3,434,536 | Tubbs | Mar. 25, 1969 |
| 3,471,176 | Gilchrist | Oct. 7, 1969 |
| 3,527,483 | Dashner | Sep. 8, 1970 |
| 220,438 Austrian | | |

In the above listed patents there is disclosed the conventional type of sleeve fittings for use with metal pipe as well as those sleeve fittings more adaptable for use with plastic pipe. Additionally, there is a representative showing of gasket rings of different configurations but it will be noted that these gasket rings are used in a different environment such as in bell and spigot joints and the like.

BRIEF SUMMARY OF THE INVENTION

Briefly the present invention relates to a sleeve fitting comprising two halves for encompassing a pipe such as a plastic pipe although the invention is not limited to a plastic pipe. The top half of the fitting is a service sleeve member made of cast iron and including a saddle at one end thereof and a through bore extending therethrough, opening to the curved surface of the saddle which is generally complementary to the pipe. The curved surface of the saddle is provided with a groove or recess spaced from and extending entirely around the opening of the through bore to such surface, the groove or recess receiving a gasket ring having three distinct design configurations.

First, the gasket seal ring on its inner periphery is provided with a thin protruding lip for making a seal between the surface of the pipe and the surface between the groove or recess and the opening of the through bore to the curved surface of the saddle. This seal, while depending primarily upon pressure exerted by the saddle and the pipe on the protruding lip is also enhanced by pressure of the fluid in a branch line when the branch line is connected to the fitting as the leading edge of the lip is exposed thereto.

Secondly, the gasket seal ring is provided on its outer periphery with a bulbous portion containing a large volume of the elastomer such as rubber or a rubber-like material. The purpose of the bulbous portion is to compensate for dimensional pipe variation and also to secondarily provide a seal resulting solely from pressure exerted thereon of the two elements thereon. The bulbous portion further functions to support the saddle of the sleeve member slightly off the surface of the pipe.

A third feature of the gasket ring is the provision of a plurality of alternate ridges and valleys or depressions, the ridges and valleys being on a side of the gasket received in the groove or recess and these ridges make a seal with the recess. Since the service sleeve and its saddle are usually made of cast iron, the surface of recess or groove is not smooth and thus any excessive pressure on various ridges or parts of ridges will cause the same to flow into the valleys so that an excellent seal is still made when the fitting is applied to the pipe.

The bottom half of the sleeve-like fitting is an arcuate saddle clamp member having a curved surface generally complementary to the surface of the pipe. A support gasket made of softer material than the material of the pipe at least covers the curved surface of the saddle clamp member and supports the saddle clamp member away from the pipe to prevent scratching, cutting or abrading of the same. This support gasket also extends between the opposed flanges of the top and bottom halves of the fitting and seals around the bolts to protect the bolt threads from corrosion. When the fitting has been applied to the pipe, the support gasket has sufficient friction with both the fitting and the pipe to prevent longitudinal slippage and/or relative rotation between the fitting and the pipe.

Both halves of the sleeve fitting may be provided with a corrosion protective coating applied to the cast iron and this coating may be an epoxy, corrosion resistant paint or the like.

BRIEF DESCRIPTION OF THE DRAWINGS

FIG. 1 is a vertical cross-sectional view, partly in elevation, of the sleeve-like fitting of the present invention, the view omitting the pipe or main and showing the gasket ring in its relaxed position.

FIG. 2 is an enlarged fragmentary view of a portion of FIG. 1 but illustrating the gasket ring making a seal with the pipe or main.

FIG. 5 is an enlarged radial section through the gasket ring of FIGS. 3 and 4.

DETAILED DESCRIPTION OF THE INVENTION

Figure 7:
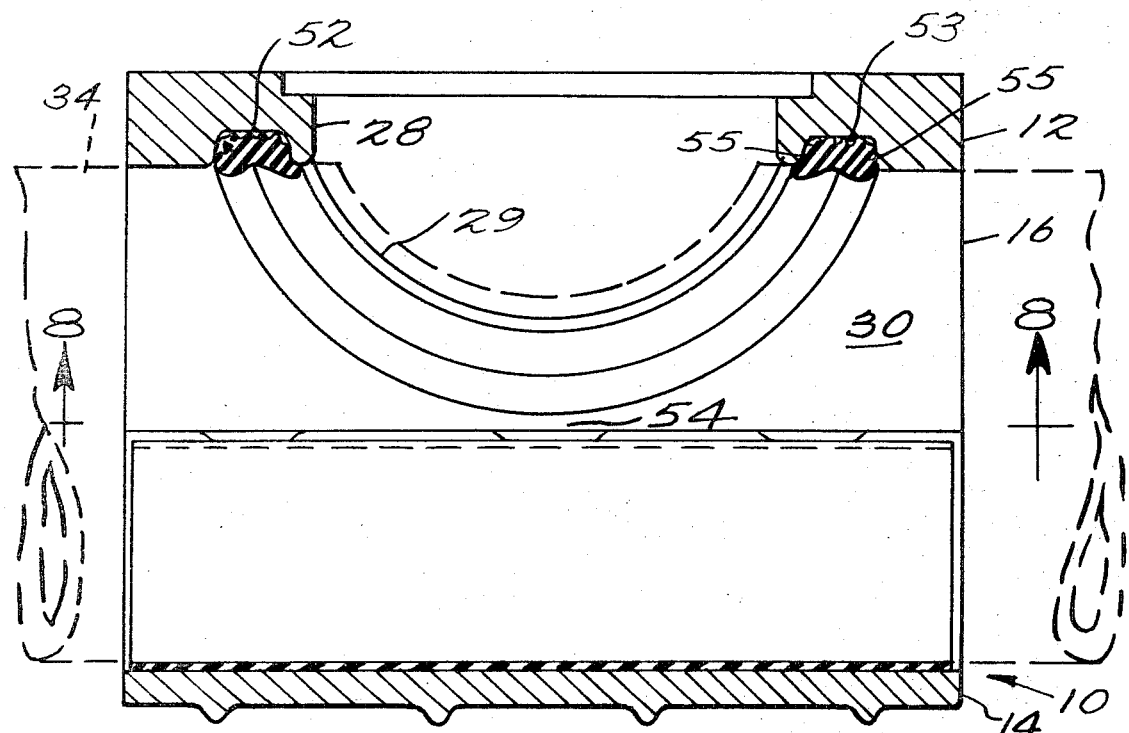
FIG. 7 is a sectional view taken substantially on the line 7—7 of FIG. 1, the gasket ring being shown in its relaxed position but the view illustrating the pipe or main in broken lines.
Figure 8:
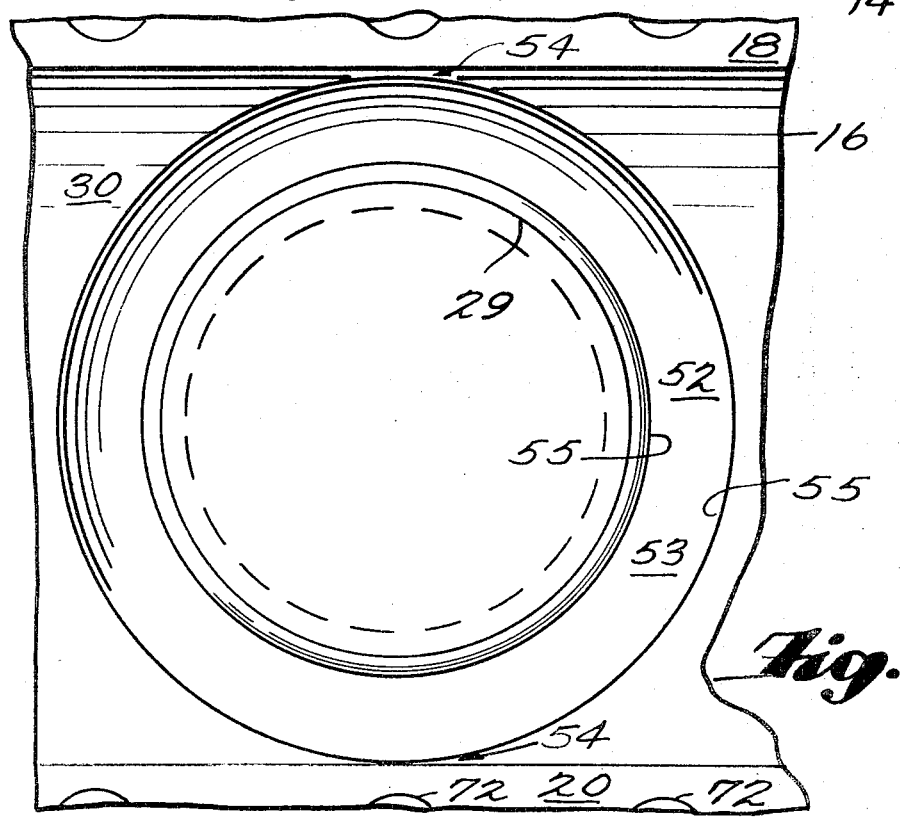
FIG. 8 is a fragmentary view taken on the line 8—8 of FIG. 7 but omitting the gasket ring from its recess or groove.

Referring now to the drawings wherein like characters or reference numerals represent like and similar parts, there is disclosed in FIGS. 1, 2, 7 and 8 a sleeve fitting 10 of the present invention comprising an upper part or service sleeve member 12 and a lower part or arcuate saddle clamp member 14. In FIGS. 1 and 7 it will be noted that the service sleeve member 12 is provided at its lower end with an arcuate saddle 16 having oppositely disposed flanges 18 and 20 which extend longitudinally in a direction along the axis of a pipe 34 and an annular flange 22 extending about its upper end. The flange 22 is provided with a plurality of circumferentially spaced bolt holes 24 through which bolts (not shown) may be utilized to attach a branch pipe or line or a tapping machine as indicated diagramatically at 26 by the broken lines. A through bore 28 extends through the service sleeve member 12 and opens thereon as indicated at 29 on a curved surface 30 of the saddle 16, the curved surface 30 being generally complementary to the curved surface of the pipe 34.

The arcuate saddle clamp member 14 has a curved surface 32 also generally complementary to the curved surface of the pipe or main 34 (FIG. 2). Additionally, the saddle clamp member 14 is provided with oppositely disposed flanges 36 and 38 also extending longitudinally in a direction along the axis of the pipe 34, these flanges opposing the flanges 18 and 20 when the upper part or service sleeve member 12 and lower part or saddle clamp member 14 encompass the pipe 34. The opposed flanges 18, 36 and 20, 38 respectively are provided with aligned holes or apertures as indicated at 40 and 42 for receiving threaded bolts 44. The upper flanges 18 and 20 of the sleeve member or upper part 12 are provided with ribs 46 spaced on either side of each of the holes, the ribs 46 confining opposite sides of the bolt heads 48 so that the bolts do not turn when the nuts 50 are being applied.

The curved surface of the saddle 16 is provided with a recess or groove 52 extending completely around the opening 29 of the through bore 28 but being spaced therefrom and also spaced from the lower edge of the flanges 18 and 20 as indicated at 54. As will be noted in FIG. 8, it appears that the groove 52 is circular but this is only because this groove is shown in plan elevation. Since the groove 52 is on the curved surface 30 of the saddle 16, it is in effect oval when laid out flat and it has a major axis extending transverse to the axis of the pipe 34 and a minor axis extending parallel to or longitudinally of the axis of the pipe 34. In any event, it is preferable to have the groove or recess 52 concentric of the opening 29 and consequently it is equally spaced from the opening 29 of through bore 28 in all radial planes of the same. The groove 52 has an elongated bottom wall 53 and side walls 55.

Figure 3:
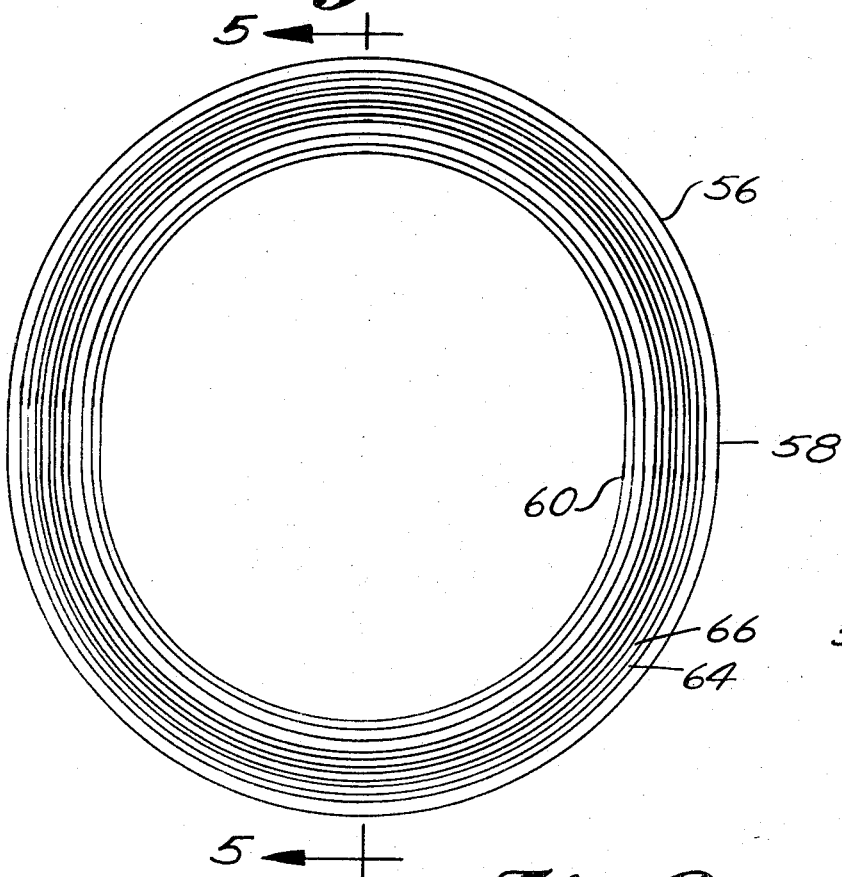
FIG. 3 is a plan elevational view of the gasket ring of the present invention when relaxed.
Figure 4:
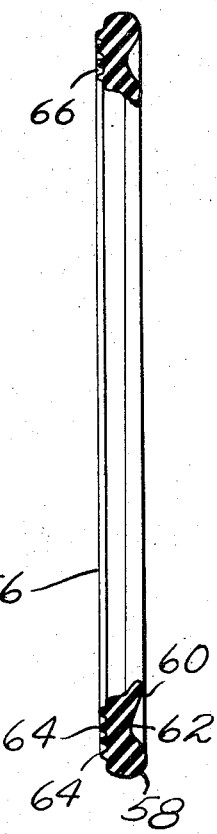
FIG. 4 is a sectional view taken on the line 5—5 of FIG. 3.

Referring now to FIGS. 3, 4 and 5, there is disclosed a gasket ring 56 made preferably of Buna N rubber or a rubber-like material having a shore A durometer hardness in the range of 60 to 80. The gasket ring 56 is also oval shaped having a major axis and a minor axis, the gasket ring being complementary in size so that it can snugly fit into the groove or recess 52. The gasket ring 56 has a cross-sectional shape as best shown in FIG. 5 which includes three distinct features. First, the outer periphery of the gasket ring 56 has an enlarged bulbous portion 58 having a large volume of rubber therein and this portion extends about and against the outer periphery or wall 55 of the recess 52 as shown in FIGS. 1 and 7 where the gasket ring is illustrated in a relaxed condition. Secondly, the gasket ring 56 has an inner periphery shaped as a thin protruding lip 60, this being separated on outer side of the gasket ring from the bulbous portion by a concave groove section 62. The inner or other side of the gasket ring 56 which is arranged to be received against the bottom wall 53 of the recess or groove 52 has a plurality of ridges 64 separated from each other by valleys or depressions 66. As will be explained later in the specification, the bulbous portion 58, protruding lip 60 and ridges and valleys 64 and 66 each performs separate functions which, when integrated together, enhance the sealing around the opening 29 and between the surface of the pipe 34 under any conditions of operation.

Figure 6:
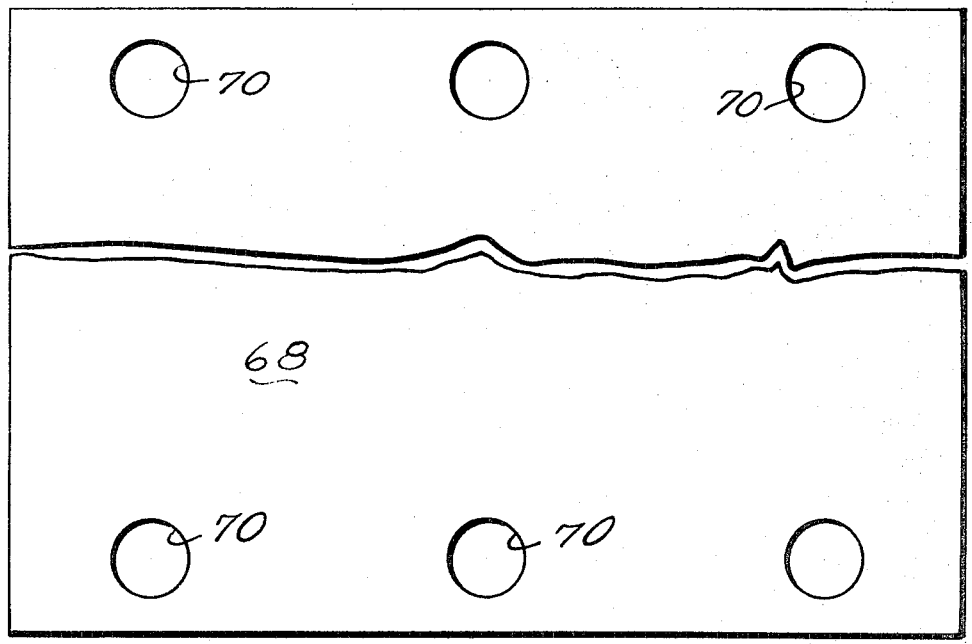
FIG. 6 is a plan elevational view of the support gasket for the lower half or saddle clamp member of the fitting of the present invention, the view being broken away.

Referring now to FIGS. 1, 2 and 6, there is disclosed a support gasket member 68 generally rectangular in shape and arranged to completely cover the curved surface 32 of the saddle clamp member 14. The support gasket 68 extends between the respective pairs of flanges 18, 36 and 20, 38 and beyond the bolt holes therein, the gasket being provided with apertures 70 to align with the bolt holes in the flanges. The apertures 70 have a diameter slightly less than the diameter of the bolts 44 and thus when the bolts are inserted through the aligned holes 40 and 42 in flanges and the holes 70 in the gasket 68 and the upper part sleeve member 12 is clamped to the lower part saddle clamp member 14, the pads 72 integrally formed on each of the flanges and extending about each of the bolt holes in each of the flanges will clamp the support gasket tightly therebetween and provide a seal for the threads of the bolts. The main function of the support gasket 68 is to support the saddle clamp member 14 away from the pipe main 34 and thus the support gasket must be of a softer material than the material of the plastic pipe 34 so that the surface of the pipe cannot be cut, scratched or abraded. When the pipe 34 is made of PE or PVC it is preferable that the support gasket 68 be made of an elastomer such as a rubbr or rubber-like material, the elastomer covering a duck material to give the gasket body. A secondary function of the support gasket 68 is to prevent the sleeve-like fitting 10 from sliding longitudinally along the pipe or rotating relative to the pipe once it has been installed. By utilizing a rubber or rubber-like material for the support gasket 68 there is sufficient friction provided between the pipe 34 and the gasket and between the gasket and the saddle clamp member 14 to prevent such slippage.

When it is desired to cut a hole H in the pipe 34 or to provide a seal around the already cut hole H, the fitting including the cast iron service sleeve member 12 and the saddle clamp member 14 is clamped about the plastic pipe 34 as shown in FIG. 1. In the enlarged fragmentary section of FIG. 2 it will be noted that the gasket ring 56 under pressure assumes a slightly different configuration than when in its relaxed configuration of either FIG. 1 or FIG. 5. When pressure is applied at $P_1$ and $P_2$ by the pipe 34 and the portion of the curved surface between the groove 52 and opening 29 to the thin protruding lip 60 the lip cold flows toward the opening 29 of the through bore 28 on the curved surface 30 of the saddle 16. This provides an excellent mechanical seal but it will also be noted that when the fitting is in use and the pipe 34 is under fluid pressure, the pressure of the fluid $P_F$ works against the end of the lip and provides an even tighter seal. In fact, as the pressure $P_F$ of fluid increases, the seal becomes tighter but the seal is still maintained at low or zero pressure in the pipe because of the pressure exerted on the lip 60 at $P_1$ and $P_2$. The bulbous portion 58 compensates for any variations in the outer dimensions of the pipe 34. Because there is a concave section groove 62 between the bulbous portion 58 and the lip 60 some of the large volume of rubber in portion 58 can flow into the section or groove leaving only a small groove 62 (FIG. 2) or completely filling out the groove 62. The ridges 64 bear against the bottom wall 53 of the recess or groove 52 and any pressure exerted thereon can be compensated for since the ridges can flow into the valleys 66 therebetween. These ridges 64 function as a secondary seal and in effect provide a further seal with the rough cast iron surface of the groove 52. This is enhanced because of the flexibility of the ridges 64 against any roughness in the wall 53 of the recess or groove 52.

The terminology used throughout this specification is for the purpose of description and not limitation, the scope of the invention being defined in the claims.

What is claimed is:

1. A fitting for use as a sleeve for plastic pipe comprising:

a service sleeve member having a through bore, said sleeve member having a saddle at one end thereof through which said through bore extends and opens, said saddle having a curved surface substantially complementary to a portion of the surface of the plastic pipe and having flanges extending from each longitudinal edge thereof, said curved surface of said saddle having an annular recess extending about and spaced from the opening of said through bore;

sealing means carried in said annular recess to support said sleeve member away from the plastic pipe and to provide a seal between said saddle and said pipe around said opening;

a saddle clamp member having a curved surface substantially complementary with a portion of the surface of the plastic pipe, said curved surface of said saddle clamp member having flanges extending from each longitudinal edge thereof, said saddle clamp member cooperating with the saddle of said sleeve member to embrace the plastic pipe therebetween with their respective flanges opposing one another;

a support gasket carried by said saddle clamp member and completely covering the curved surface of the same, said support gasket extending between the respective opposing flanges of said saddle and said saddle clamp member, said support gasket being made of a softer material than said plastic pipe so as to protect the same, said support gasket further providing resistance of movement of said fitting with respect to said pipe; and bolt means clamping said first and second saddles about the plastic pipe, said bolt means including threaded bolts extending through said flanges and said support gasket, said threaded bolts having their threads protected from corrosion by said support gasket.

2. A fitting as claimed in claim 1 wherein said sleeve member and said saddle clamp member are cast iron and in which said support gasket is an elastomeric material.

3. A fitting as claimed in claim 2 wherein said elastomeric material of said support gasket is a duck covered rubber material.

4. A fitting as claimed in claim 3 wherein said cast iron sleeve member and said saddle clamp member have a corrosive protective coating thereon.

5. A fitting as claimed in claim 4 wherein said corrosive protective coating is an epoxy.

6. A fitting as claimed in claim 1 wherein said sealing means carried in the recess in said saddle of said sleeve member is an annular gasket ring having a major and a minor axis and a shore A durometer hardness in the range of 60 to 80.

7. A fitting as claimed in claim 1 wherein said sealing means carried in the recess in said saddle of said sleeve member is an annular elastomeric gasket having a bulbous portion extending about its outer periphery for compensating for variation in pipe dimension, a thin protruding lip extending about its inner periphery for sealing between the exterior of the plastic pipe and a surface area of the curved surface of said saddle of said sleeve member between the recess and the opening of the through bore, and a plurality of alternate ridges and valleys, said ridges engaging the wall of the recess and flowing into said valleys upon application of pressure.

8. A fitting as claimed in claim 7 wherein said recess on the curved surface of the saddle of said sleeve member and said annular gasket are concentric with said through bore.

9. A fitting for use as a sleeve for pipe or the like comprising:
   a service sleeve member having a through bore, said sleeve member having a saddle at one end thereof and through which the through bore extends and opens, said saddle having a curved surface substantially complementary to a portion of the surface of the pipe, said curved surface of said saddle having a recess extending about and spaced from an opening of said through bore;
   sealing means carried in said recess to support said saddle of said sleeve member away from the pipe and to provide a seal between said sleeve and said pipe around said opening, said sealing means being an endless elastomeric gasket ring having a bulbous portion positioned in said recess and extending about said gasket ring's outer periphery for compensation in variation of pipe dimension and sealing therewith and also resisting extrusion of said gasket ring outwardly of said recess between the saddle and the exterior of the pipe, a thin protruding lip extending from one side only of said bulbous portion about said gasket ring's inner periphery, said protruding lip being partially in the recess and partially out of said recess and capable upon application of pressure to said gasket ring of extruding and sealing between the exterior of the pipe and a surface area of the curved surface of said saddle between the recess and the opening of the through bore, and a plurality of alternate ridges and valleys on one side of said gasket ring, said ridges engaging only the wall of the recess and flowing into said valleys upon application of pressure to said gasket ring; and
   clamping means for clamping said sleeve member on said pipe.

10. A fitting as claimed in claim 9 wherein said through bore is circular in cross section intermediate its ends and wherein said recess is concentric with the opening of said through bore on the curved surface of said saddle.

11. A fitting as claimed in claim 10 in which said endless gasket ring is oval shaped in plan elevation and has a minor axis and a major axis, said minor axis lying parallel to the axis of the pipe when said sleeve member is in position thereon.

12. A fitting as claimed in claim 11 wherein said gasket ring has a shore A durometer hardness in the range of 60 to 80.

13. A fitting as claimed in claim 12 wherein said gasket ring has a concave depression between said bulbous portion and said lip on its side opposite the side having the alternate ridges and valleys.

14. A fitting as claimed in claim 9 in which said clamping means includes a saddle clamp member having a curved surface substantially complementary to the surface of the pipe and bolt means for attaching said saddle clamp to said sleeve member to embrace the pipe, and a support gasket covering the curved surface of said saddle clamp member and being made of a softer material than said pipe.

15. A fitting as claimed in claim 14 in which said sleeve member and said saddle clamp member are made of cast iron and in which said pipe is a plastic material.

* * * * *

UNITED STATES PATENT OFFICE
CERTIFICATE OF CORRECTION

PATENT NO. : 3,840,255
DATED : October 8, 1974
INVENTOR(S) : Joseph L. Daghe

It is certified that error appears in the above-identified patent and that said Letters Patent are hereby corrected as shown below:

IN THE SPECIFICATION:

Column 5, line 15, delete "rubbr" and insert --rubber--.

IN THE CLAIMS:

Claim 3, line 45, delete "duck" and insert --rubber--.

line 46, delete "rubber" and insert --duck--.

Signed and Sealed this fifth Day of August 1975

[SEAL]

Attest:

RUTH C. MASON
Attesting Officer

C. MARSHALL DANN
Commissioner of Patents and Trademarks